United States Patent [19]

Kido

[11] Patent Number: 5,029,033
[45] Date of Patent: Jul. 2, 1991

[54] TAPE RECORDER WITH A REDUCED THICKNESS

[75] Inventor: Kunio Kido, Tokyo, Japan

[73] Assignee: Tanashin Denki Co., Ltd., Tokyo, Japan

[21] Appl. No.: 550,504

[22] Filed: Jul. 10, 1990

[30] Foreign Application Priority Data

Aug. 7, 1989 [KR] Rep. of Korea ............... 11694[U]

[51] Int. Cl.$^5$ ............................................. G11B 15/00
[52] U.S. Cl. .................................... 360/132; 360/137; 360/93
[58] Field of Search .................. 360/96.5, 92.93, 96.1, 360/137; 242/197–199

[56] References Cited

U.S. PATENT DOCUMENTS 3,289,085 11/1966 Leland ................................. 455/95
4,593,331 6/1986 Tomita ........................... 360/96.5 X
4,669,006 5/1987 Tomita ............................... 360/93
4,712,145 12/1987 Naruki et al. ..................... 360/93 X

FOREIGN PATENT DOCUMENTS 434444 11/1974 U.S.S.R. ............................ 360/137

Primary Examiner—John H. Wolff
Attorney, Agent, or Firm—Oblon, Spivak, McClelland, Maier & Neustadt

[57] ABSTRACT

Disclosed is a thin tape recorder of which the chassis is mounted aslant in a case body of a tape recorder case, that is, the chassis declines with an approximate gradient of $(L_1-L_2)/2L$ so that the space between the chassis and a front wall of the cover becomes gradually wide toward the magnetic head, where $L_1$ is the thickness of the front end of the tape cassette, $L_2$ is the thickness of the rear end of the tape cassette, and L is the length from the rear end of a thick portion to the rear end of a thin portion.

1 Claim, 2 Drawing Sheets

TAPE RECORDER WITH A REDUCED THICKNESS

BACKGROUND OF THE INVENTION

1. Field of the Invention

The present invention relates generally to a tape recorder and more particularly, to a tape recorder of a reduced thickness and has a chassis mounted aslant in a case body of a tape recorder case by dimensional differences between a thick portion and a thin portion of a tape cassette.

2. Description of the Prior Art

In a conventional tape recorder as shown in FIG. 3, it is well-known that such tape recorder includes a tape recorder case 4 having a cover 3 being able to open and close so as to lodge a tape cassette 2 into a case body 1, a magnetic head 5 mounted in the inner portion of a side wall 3a of said cover 3, a chassis 6 mounted in parallel with a front wall 3b of said cover 3 and contacting the front face thereof to a rear wall 2a of said tape cassette 2, a tape-driven mechanism 8 supported by said chassis 6 and mounted in a space 7 between said chassis 6 and a rear wall 1a of the case body 1, a battery receptacle 9 mounted in the inner portion of the case body 1 in opposite to the magnetic head 5, and a circuit board 10 mounted in the inner portion of the rear wall 1a of the case body 1.

Also, in such a tape recorder, there is a tendency that the plane size of a tape recorder case 4 is close to the outer size of the tape cassette 2 in order to make the plan size as small as possible, and that the tape-driven mechanism 8 and the circuit board 10 are received in the space 7 having the height which is identical with the outer diameter R of a battery 11 (three or four-type) in order to achieve the thickness size as thin as possible.

In such conventional tape recorder, the chassis 6 is mounted in parallel with the front wall 3b of the cover 3. Accordingly, it is inevitable to reduce the thickness of the cover 3 and the case body 1 in the tape recorder case 4 in order to achieve thinner size.

More specifically, in the conventional tape cassette 2 as shown in FIG. 3, the thickness $L_1$ of the thick portion 2b is is substantially 12.1 mm, the thickness $L_2$ of the thin portion 2c is substantially 8.7 mm, and the outer diameter R of the battery 11 in three-type is 14 mm. In this case, the length $L_3$ of the tape recorder case 4 is as follows:

$$L_3 = [(L_1 + L_2)/2] + R + A$$
$$= [(12.1 + 8.7)/2] + 14 + A$$
$$= 24.4 + A$$

Where A is the thickness of the tape recorder case 4 itself, i.e., the least margin of thickness for safety. Accordingly, there is a problem in that it is difficult to make the thickness of the tape recorder case 4 thinner.

SUMMARY OF THE INVENTION

It is a general object of the invention to provide a thin tape recorder case of the tape recorder.

In order to achieve the object of the invention, the invention resides in a tape recorder comprising a tape recorder case 20 having a cover 22 being able to open and close so as to lodge a tape cassette 23 into a case body 21, a magnetic head 24 mounted in the inner portion of a side wall 22a of said cover 22, a chassis 25 contacting the front face thereof to a rear wall 23a of said tape cassette 23, a tape-driven mechanism 30 supported by said chassis 25 and mounted in a space 26 between said chassis 25 and a rear wall 21a of the case body 21 and a battery receptacle 32 mounted in the inner portion of the case body 21 in opposite to the magnetic head 24 characterized in that said chassis 25 declines with an approximate gradient of $(L_1-L_2)2L$ so that the space between said chassis 25 and a front wall 22b of said cover 22 becomes gradually wider toward said magnetic head 24, where $L_1$ is the thickness of the front end (i.e., head inserting portion) of the tape cassette 23, $L_2$ is the thickness of the rear end of the tape cassette 23, and L is the length from the rear end 27a of a thick portion to the rear end 29a of a thin portion.

It is possible to obtain a thin tape recorder case by declining the chassis with the space between the chassis and a front wall of the cover being gradually wider toward the magnetic head.

BRIEF DESCRIPTION OF THE DRAWINGS

The preferred embodiment of the invention will now be described, by way of example, with reference to the accompanying drawings in which.

DESCRIPTION OF THE PREFERRED EMBODIMENT

Referring now to the FIG. 1 and FIG. 2 an embodiment of the invention will be described.

Figure 1:
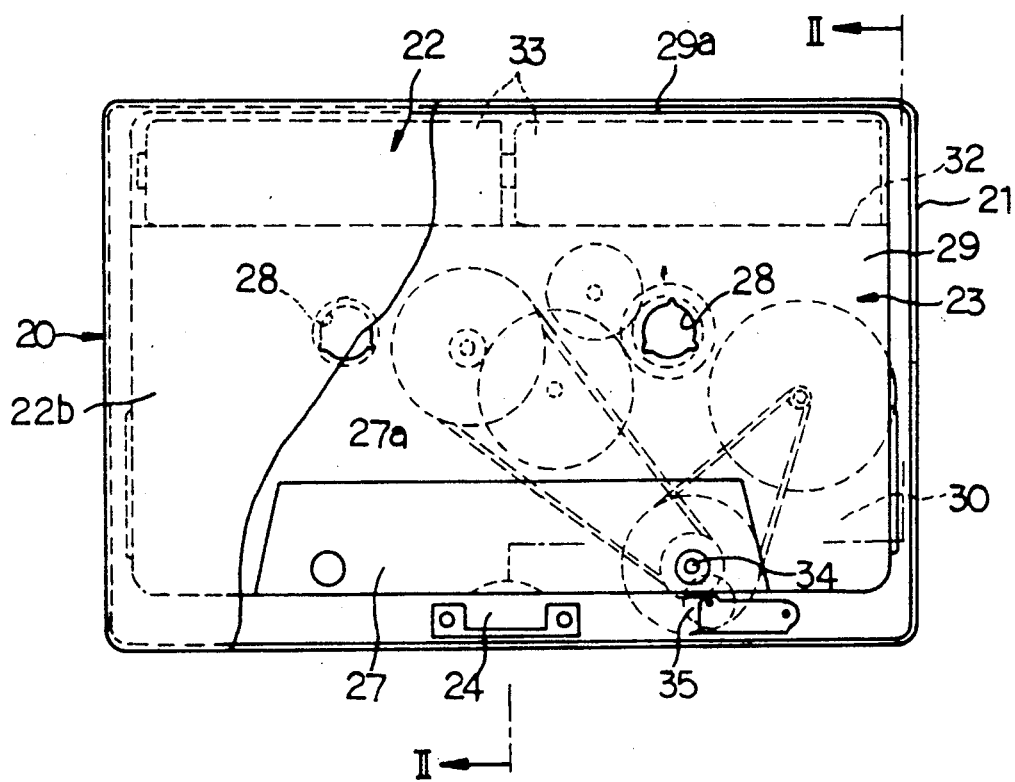
FIG. 1 is a plan view of the tape recorder with partically cut-away according to an embodiment of the invention.
Figure 2:
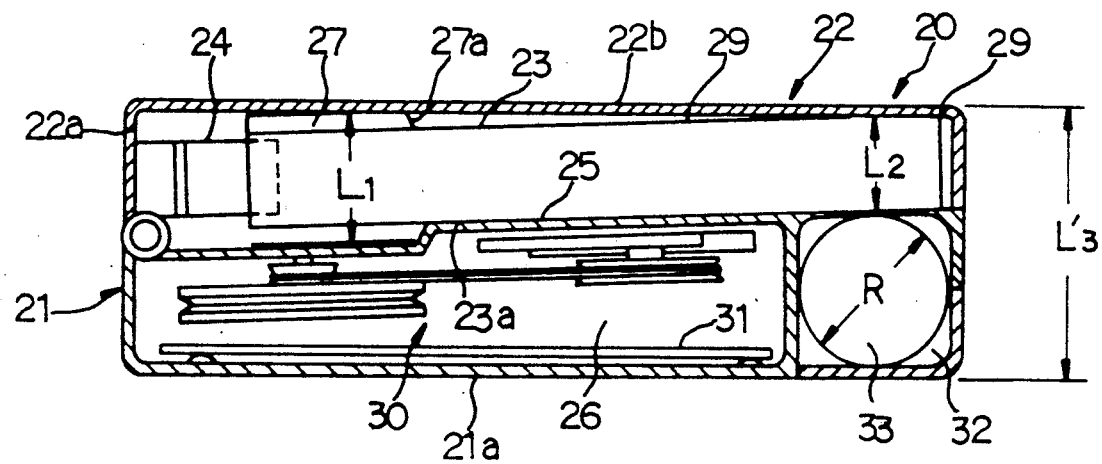
FIG. 2 is a sectional view taken along the line II—II in FIG. 1.
Figure 3:
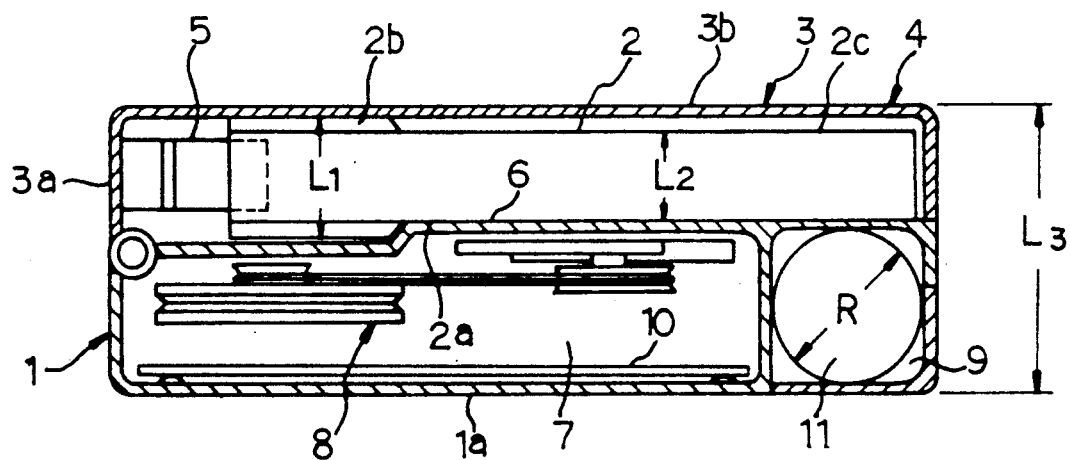
FIG. 3 is a sectional view of a conventional tape recorder similar t FIG. 2.

FIG. 1 is a plan view of the tape recorder with partially cut-away according to the invention and FIG. 2 is a sectional view taken along the line II—II in FIG. 1.

In both Figures, there is shown a tape recorder case 20 having a cover 22 being able to open and close so as to lodge a tape cassette 23 into a case body 21. A magnetic head is mounted in the inner portion of a side wall 22a of the cover 22. A chassis 25 is mounted in the case body(21). The chassis 25 declines with an approximate gradient of $(L_1-L_2)/2L$ so that the space between the chassis 25 and a front wall 22b of the cover 22 becomes gradually wider toward the magnetic head 24, where L is a length from the rear end 27a of a thick portion 27 to the rear end 29a of a thin portion 29. A tape-driven mechanism 30 is supported by the chassis 25 in the space 26, the hidden portion of space 26 being shown in phanton lines and having a phantom lead line. Also in the space 26, a circuit board 31 is mounted in the inner rear wall 21a of the case body 21. Mounted in the inner portion of the case body 21 opposite to the magnetic head 24 is a battery receptacle 32 in which two 3-or 4-type batteries are received in series and contact each other. In FIG. 1, there are a capstan 34 and a pinch roller 35 contactable to and separable from the capstan 34.

In this embodiment, the length L'3 of the tape recorder case 20 is as follows:

$$L'_3 = L_2 + R + A$$
$$= 8.7 + 14 + A$$
$$= 22.7 + A$$

Accordingly, the length is shortened by 1.7 mm, that is, the thickness of the tape recorder case 20 is thinner than the prior art.

As described hereinbefore, since the chassis 25 declines with approximate gradient of $(L_1-L_2)/2L$ so that the space between the chassis 25 and the front wall 22b of the cover 22 becomes gradually wide toward the magnetic head 24, it is possible to make the tape recorder case thinner. In addition, the tape cassette 23 is easily lodged by declining the chassis 25.

Obviously, numerous modifications and variations of the present invention are possible in light of the above teachings. It is therefore to be understood that within the scope of the appended claims, the invention may be practiced otherwise than as specifically described herein.

What is claimed is:

1. A tape recorder which comprises:
   a tape recorder case having a cover openable and closeable so as to lodge a tape cassette into a case body,
   a magnetic head mounted in the inner portion of a side wall of said cover,
   a chassis contacting the front face thereof to a rear wall of said tape cassette,
   a tape-driven mechanism supported by said chassis and mounted in a space between said chassis and a rear wall of the case body, and
   a battery receptacle mounted in the inner portion of the case body opposite to the magnetic head wherein said chassis declines with an approximate gradient of $(L_1-L_2)/2L$ so that the space between said chassis and a front wall of said cover becomes gradually wider toward said magnetic head and wherein $L_1$ is a thickness dimension of the front end of the tape cassette, $L_2$ is a thickness dimension of the rear end of the tape cassette and L is a length dimension from the rear end of a thick portion to the rear end of a thin portion.

* * * * *